United States Patent [19]

Kawashita

[11] Patent Number: 5,070,417
[45] Date of Patent: Dec. 3, 1991

[54] DISC DRIVE UNIT AND METHOD AND SYSTEM FOR CONTROLLING THE SAME

[75] Inventor: Asayoshi Kawashita, Chigasaki, Japan

[73] Assignee: Hitachi, Ltd., Tokyo, Japan

[21] Appl. No.: 439,804

[22] Filed: Nov. 21, 1989

[30] Foreign Application Priority Data

Nov. 22, 1988 [JP] Japan .................................. 63-295295

[51] Int. Cl.$^5$ ........................ G11B 15/18; G11B 19/00
[52] U.S. Cl. ............................................ 360/71; 360/69
[58] Field of Search ................... 360/71, 70, 69, 75, 360/105

[56] References Cited

U.S. PATENT DOCUMENTS

| | | | |
|---|---|---|---|
| 4,445,188 | 4/1984 | Barrett | 360/75 X |
| 4,635,145 | 1/1987 | Horie et al. | 360/75 X |
| 4,701,813 | 10/1987 | Miyake et al. | 360/71 |
| 4,727,443 | 2/1988 | Miyake et al. | 360/75 |

FOREIGN PATENT DOCUMENTS

62-38562  2/1987  Japan ...................................... 360/71

Primary Examiner—John H. Wolff
Attorney, Agent, or Firm—Antonelli, Terry, Stout & Kraus

[57] ABSTRACT

A disc drive control method in which a command for disc rotation is sent to the disc drive mechanism upon receipt of a 'drive-ON' signal, a timing operation is started in response to receipt of a 'drive-OFF' signal, and a command for stoppage of the disc rotation is sent to the disc drive mechanism if there is no further 'drive-ON' signal received within a predetermined time interval. A disc drive control system comprises devices for effecting the steps of the disc drive control method. A disc drive unit employable in the disc drive control method and system comprises a disc drive mechanism for producing rotational movement of a disc and a disc drive control device for controlling rotation of the disc by means of the disc drive mechanism. The disc drive control method and/or system may also be applied to an information processing system which comprises at least a processor and a flexible disc drive unit.

17 Claims, 7 Drawing Sheets

DISC DRIVE UNIT AND METHOD AND SYSTEM FOR CONTROLLING THE SAME

BACKGROUND OF THE INVENTION

1. Field of the Invention

This invention relates to a disc drive unit for driving a disc-shaped memory element, such as a flexible disc or the like, and a method and a system for controlling the disc drive unit. This invention further relates to an information processing system and other electronic equipments which include the disc drive unit.

2. Background Arts

Some of disc drive units, particularly flexible disc drive units, have no head unloading mechanism which acts to move a head away from a surface of a disc when the head is not in use for reading or writing, for the reason of reducing the size of the unit and lowering the cost of the same. The disc drive unit of this kind involves such a serious problem that the head is always held in contact state with the surface of the disc and, therefore, if the disc is continuously rotated, the disc will be worn away in relatively short time, reducing the life of the disc.

Even in the case of a disc drive unit provided with a head unloading mechanism, if a liner which is used for cleaning the surface of the disc is held in continuous contact with the surface of the disc, the disc will be worn away in relatively short time as in the case of the conventional disc drive unit without head unloading mechanism as describe above.

In order to solve these problems, it has been proposed to utilize an upstream unit which effects access to the disc in such a manner that it may control a disc drive motor to stop the rotation of the motor and consequently rotation of a flexible disc when the disc is not subjected to reading or writing operation. This proposal is effective to improve a pass durability of the disc.

According to this proposal, the rotation and stoppage of the disc drive spindle motor are carried out in response to a 'motor-ON' signal outputted from the upstream unit. More particularly, this system is arranged to start the rotation of the motor by a logic '1' 'motor-ON' signal and to stop the rotation of the motor by a logic '0' signal. With this arrangement, the rotation and stoppage of the motor is controlled.

The disc device of this type, however, has a drawback again as will be described hereinafter. Once the disc driving motor is stopped, a time (about 1 sec.) is required for the motor to attain its steady rotation for a reading or writing operation. Accordingly, a substantial time is needed for actuation of the disc in the conventional disc device, especially when access operation is carried out frequently. This lowers the performance of the entire system.

One of the ideas to solve these problems is to utilize a program of an upstream unit, for example, a host computer for controlling the disc rotation. In this case, the program may include functions to monitor as to whether there is a further access or not after termination of one access and stop the motor when there is no further access.

This idea, however, presents another problem that it is difficult to predict a time when the next access occurs in the program, which makes it difficult to set the timing of stoppage of the motor.

This problem might be solved by controlling the motor to stop when there is no next access within a predetermined time, for example, 5 sec. after termination of the first access.

This solution, however, again presents another problem, because all the programs to be used in the upstream units have such control functions as described above. This imposes substantial overheads for controlling the disc drive unit to the programs and lowers the performances of the programs. Thus, this proposal is not really practical.

Alternatively, an operating system may have similar control functions for the same purpose as described above. In this case, however, there remains a similar problem unsolved.

SUMMARY OF THE INVENTION

It is an object of the present invention to provide a disc drive unit which is capable of preventing wear away of a disc by controlling the rotation of the disc in such a way that the rotation of the disc is stropped, while minimizing occurrences of waits for the access to the disc, not lowering the performance of the entire system, and imposing no substantial overheads to programs.

It is another object of the present invention to provide a method and a system for controlling the disc drive unit which is capable of preventing wear away of a disc by controlling the rotation of the disc in such a manner that the rotation of the disc is stopped, while minimizing occurrences of wait in the access to the disc, not lowering the performance of an entire system, and imposing no substantial overheads to programs.

It is a further object of the present invention to provide an information processing system or other electronic equipments comprising the disc drive unit which is capable of preventing wear away of a disc by controlling the rotation of the disc in such a manner that the rotation of the disc is stopped, while minimizing occurrences of wait in the access to the disc, not lowering the performance of an entire system, and imposing no substantial overheads to programs.

According to the present invention, there are provided, to accomplish the objects as described above, a disc drive controlling method and system, a disc drive unit, an information processing system and other electronic equipments.

The present invention features a method of controlling rotational movement of a disc by means of a disc drive mechanism. The method comprises the steps of: sending a command for disc rotation to the disc drive mechanism in response to a 'drive-ON' signal received; starting a timing operation in response to a 'drive-OFF' signal received; and sending a command for stoppage of disc rotation to the disc drive mechanism if there is no further 'drive-ON' signal received within a predetermined time interval.

The present invention further features a system for controlling rotational movement of a disc by means of a disc drive mechanism. The system comprises: means for sending a command for disc rotation to the disc drive mechanism in response to a 'drive-ON' signal supplied thereto; and means for sending a command for stoppage of disc rotation to the disc drive mechanism if there is no further 'drive-ON' signal received within a predetermined time interval after the 'drive-OFF' signal has been received.

According to another aspect of the present invention, there is provided a system for controlling rotational movement of a disc by means of a disc drive mechanism, which comprises: means for maintaining the disc rotation by means of the disc drive mechanism until a predetermined time interval has elapsed even after receipt of 'drive-OFF' signal; and means for starting the disc rotation by means of the disc drive mechanism irrespective of presence or absence of the 'drive-OFF' signal whenever 'drive-ON' signal is received.

According to a further aspect of the present invention, there is provided a system for controlling rotational movement of a disc by means of a disc drive mechanism, which comprises: a delay means for outputting a 'drive-OFF' signal given from its upstream device with a delay of a predetermined time interval; and a disc drive control means for starting rotation of the disc in response to a 'drive-ON' signal given from its upstream device and for stopping rotation of the disc in response to the 'drive-OFF' signal outputted from the delay means.

The present invention further features a disc drive unit comprising: a disc drive mechanism for providing a rotational movement to a disc; and the disc drive control system as specified above for controlling the rotation of the disc by means of the disc drive mechanism.

The present invention further features an information processing system comprising at least a processor and a flexible disc drive unit in which the flexible disc drive unit comprises the disc drive unit as specified above.

The present invention further features an electronic equipment which comprises a flexible disc drive unit and a memory medium, the flexible disc drive unit comprising the disc drive unit as specified above.

In the present invention, the 'drive-ON' signal and the 'drive-OFF' signal may be separate signals which are independent from each other, or these signals may be defined by presence and absence of a drive instructing signal, respectively. In other words, the drive instructing signal may be asserted or deasserted to define each of the signals. For example, a logical '1' may be assigned to one of those signals, while a logical '0' may be assigned to the other of them, so that they correspond to ON and OFF, respectively.

In the present invention, the disc drive mechanism may comprise a torque generating means, such as a spindle motor which generates a rotating torque, and a rotating means which receives the rotating torque to rotate the disc. These two means may be directly connected with each other or they may be connected indirectly with each other through a transmission means.

The operation of the disc drive control means for controlling the disc drive mechanism may be effected by ON or OFF operation of the torque generating means, enabling or disabling of the torque transmission by the transmission means.

The present invention may advantageously be applied to a disc drive unit in which a head is always held in contact with the surface of the disc, or a disc drive unit in which a liner for cleaning the disc is always held in contact with the surface of the disc. It is, of course, possible to apply the present invention to a disc drive unit in which the head is not always held in contact with the surface of the disc.

In the present invention, said predetermined time after receiving the 'drive-OFF' signal may be selected as desired. For example, it may be several seconds.

This predetermined time may be set by a counter, a timer or the like. For example, the timer is set by the 'drive-OFF' signal to start timing function and outputs a TIME-UP signal after lapse of the predetermined time. This signal can be an instruction for stopping the rotation which is to be given to the disc drive mechanism from the disc drive control unit.

Even after the timer has been set to start its timing function, the timer may be reset when a 'drive-ON' signal is given for further access. In this case, a TIME-UP signal is restrained from being outputted. The timer may be actuated again to start its timing function after completion of said further access operation. When the access is required quite often, the disc is allowed to rotate continuously.

With the arrangement of the drive control system as described above, an instruction to stop the rotation of the disc is given to the disc drive mechanism when the predetermined time has passed or the disc has continued its rotation for the predetermined time period after a 'drive-OFF' signal is given from the upstream unit at the end of the preceding access. Then, the disc stops its rotation. This can advantageously prevent wear away of the disc surface due to continuous contact of the head or the liner with the disc surface which is caused by continuous rotation of the disc. Thus, the durability or life of the disc can be prolonged.

In other words, the rotation of the disc is stopped only when the predetermined time has passed after the 'drive-OFF' signal has been given, but no further 'drive-ON signal' has been received, or after the disc has been allowed to rotate for the predetermined time. This means that the disc continues its steady rotation until the predetermined time has passed and therefore the disc can be accessed again upon immediately the access is requested. Further, if the access ,is made to the disc within the predetermined time, the 'drive-ON' signal is given before the rotation of the disc has been stopped. Thus, the disc continues its steady rotation, with the result that waits for access can be minimized and the deterioration of the performance of the system can be obviated.

In addition, the upstream unit connected to the disc drive unit, the program is only required to have a function to output a 'drive-ON' signal and a 'drive-OFF' signal indicative of disc rotation and disc stoppage, respectively, before and after access to the disc. Accordingly, the preparation of the program can be easier and the overhead imposed to the program can be reduced considerably, because it is not concerned at all with the control of the disc drive unit after the signal has been outputted.

BRIEF DESCRIPTION OF THE DRAWINGS

The present invention will now be described with reference to the accompanying drawings illustrating preferred embodiments of the invention in which.

DESCRIPTION OF THE PREFERRED EMBODIMENTS

Figure 1:
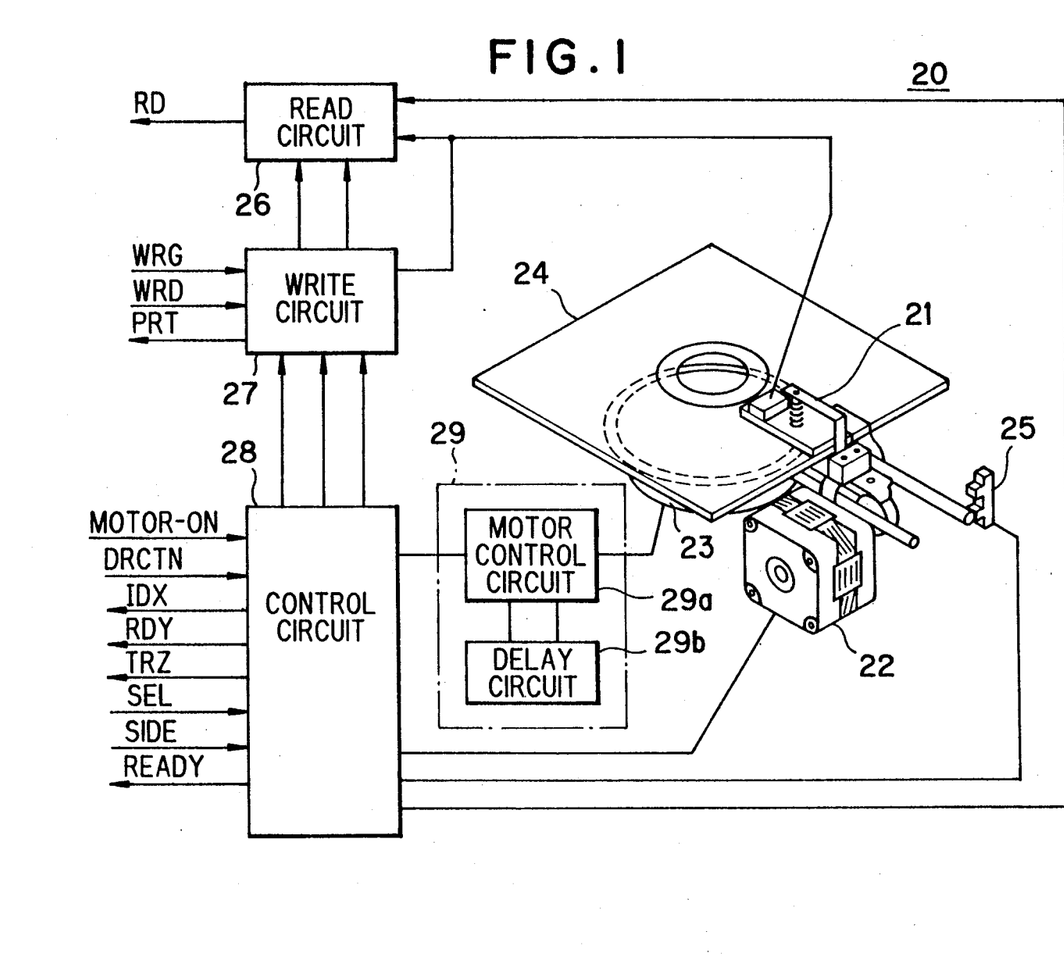
FIG. 1 is a block diagram illustrating one embodiment of a flexible disc drive unit according to the present invention.

Referring to FIG. 1, there is illustrated a flexible disc drive unit 20 according to an embodiment of the present invention.

The flexible disc drive unit 20 illustrated in FIG. 1 is formed of a mechanical section and an electronic circuitry section.

The mechanical section comprises a magnetic head mechanism 21 for reading and writing data in relation with a flexible disc 24, a step motor mechanism 22 for controlling the movement of the head, a spindle motor section 23 for rotating the flexible disc 24 and serving as a disc drive, and a detection mechanism 25 for detecting a track 00 on the disc.

The spindle motor section 23 comprises a spindle motor and a control portion for providing rotational movement of the spindle motor.

The electronic circuitry section comprises a read circuit 26, a write circuit 27, a control circuit 28, and a disc drive control circuit 29 all of which are intended for controlling of the mechanical section.

The flexible disc 24 is inserted into the disc drive unit 20 from the outside thereof and is held in position as shown in FIG. 1.

The control circuit 28 is arranged to produce several types of interface signals which are transferred to and from a flexible disc control 3 as described later with reference to FIG. 2, and some types of control signals which are transferred between various portions of the flexible disc drive unit 20.

The disc drive control unit 29 comprises a motor control circuit 29a and a delay circuit 29b.

The motor control circuit 29a is arranged for controlling the rotation and stopping of the spindle motor section 23 which serves as the disc drive mechanism as described above. More specifically, the circuit 29a equivalently receives a "drive-ON" signal to send a command for rotational movement of the flexible disc 24 to the spindle motor section 23, when a MOTOR-ON signal transmitted from an upstream unit such as a host computer which is connected to the present flexible disc drive unit 20 is of a logical '1'. On the other hand, when the motor control circuit 29a is given a TIME-UP signal from a delay circuit 29b as will be described later, the circuit 29a takes the signal as a 'drive-OFF' command and sends an instruction for stopping the rotation of the flexible disc 24 to the spindle motor section 23.

In addition, the motor control circuit 29a is arranged to effect a set/reset control for the delay circuit 29b as will be described later. More specifically, it resets the delay circuit 29b when MOTOR-ON signal is at a logical '1' level and sets the delay circuit 29b when the signal is at a logical '0' level.

The delay circuit 29b is provided, in the embodiment herein described, in the form of a timer circuit. When the MOTOR-ON signal is changed in logical level from '1' to '0' which serves as a 'drive-OFF' signal, the delay circuit 29b is set by the motor control circuit 29a as described before to start a timing function of the circuit. When a predetermined time period, for example, 2 seconds have elapsed, the delay circuit 29b produces and sends TIME-UP signal to the motor control circuit 29a. In other words, the delay circuit 29b operates to continue the rotation of the motor during the predetermined time period (for example, 2 seconds) after deassertion of the 'drive-ON' signal, i.e. the logical '1' MOTOR-ON signal.

The delay circuit 29b is reset by the motor control circuit 29a when it receives the 'drive-ON' signal as described above. Therefore, the TIME-UP signal is produced only when there is no 'drive-ON' signal received during the time period between the start and the end of the timing by the delay circuit 29a.

Figure 2:
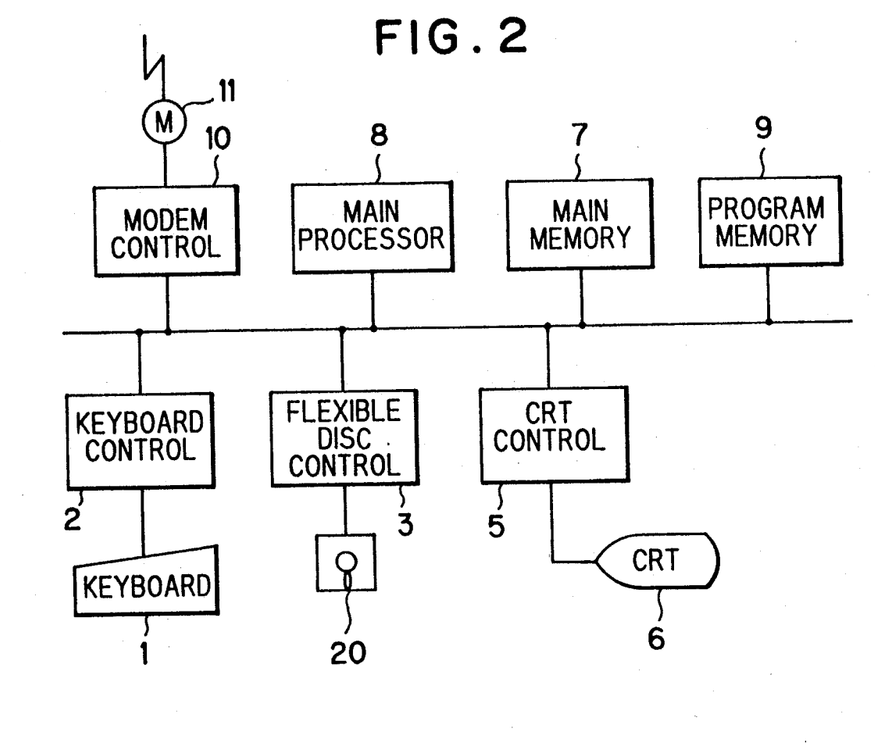
FIG. 2 is a block diagram illustrating system configuration of a video data terminal device according to the present invention.

FIG. 2 illustrates a configuration of a video data processing terminal according to the present invention, which incorporates therein the flexible disc drive unit described before with reference to FIG. 1.

Referring to FIG. 2, the video data processing terminal comprises various input/output devices such as a keyboard 1 for typing in instructions and inputting data, a keyboard control section 2, a flexible disc control section 3 for controlling access to the flexible disc drive unit 20, a CRT display 6 for displaying the data or the like, a CRT control section 5 associated therewith, a modem (modulator-demodulator) section 11 for transmitting and receiving the data through a communication line; and a modem control section 10 associated therewith.

In addition, the video data processing terminal comprises a main processor section 8 for processing the data and controlling the entire system; a main memory section 7 for storing the externally entered and processed data; and a program memory section 9 for storing a control program intended for control of the processor section 8.

An operation of the video data processing terminal in combination with the main processor section 8 and its associated elements such as the main memory section 7 connected thereto via a system bus 4, will now be described.

The data entered through the keyboard 1 by an operator is fed through the keyboard control section 2 and stored in the main memory section 7. The data is then transferred from the main memory section 7 to the CRT control section 5 under the operation of the processor section 8 according to the control program stored in the program memory section 9 and is displayed on the CRT display 6. The data is also fed to the communication line through the modem control section 10 and the modem section 11. On the other hand, the data from the communication line may be transferred and stored in the main memory section 7. This data may also be transferred from the main memory section 7 through the flexible disc control section 3 to the flexible disc drive unit 20 and stored on the disc according to the control program.

An operation of the flexible disc drive unit 20 incorporated into the video data processing terminal, along with the operation of the video data processing terminal itself will now be described.

Figure 3A:
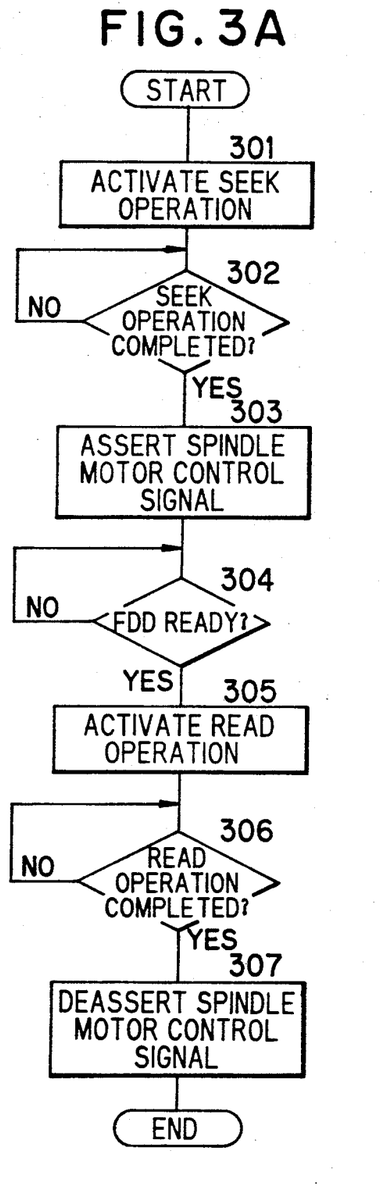
FIG. 3A is a flow chart illustrating read operation of the flexible disc under the program which is resident in a program memory section 9 as shown in FIG. 2.
Figure 3B:
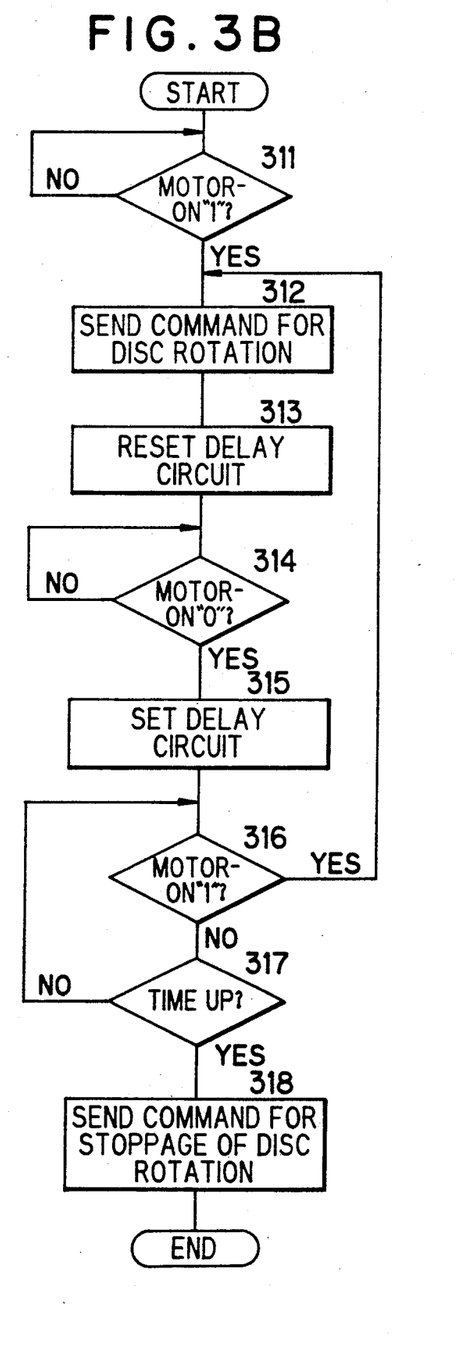
FIG. 3B is a flow chart illustrating the operation of the disc and its drive control device in the flexible disc drive unit.

FIG. 3A is a flow chart illustrating the read operation for the flexible disc under the control program which is resident in the program memory section 9 shown in FIG. 2. FIG. 3B is another flow chart illustrating flexible disc drive unit.

Referring to FIG. 3A, for reading the flexible disc 24, the main processor 8 begins a seek operation under the control of the control program in order to position the head mechanism 21 onto the intended track of the disc (step 301). After the seek operation has been completed (step 302), the spindle motor control signal (MOTOR-ON) is asserted (step 303). Then, the program waits until the rotation of the spindle motor becomes steady and constant and READY signal is asserted.

When READY signal is asserted, a read control operation is activated and the program waits for the end of the read operation (steps 305 and 306). After the read control operation has been completed, the spindle motor control signal (MOTOR-ON) is deasserted (step 307).

The signal referred to above is transferred between the flexible disc control section 3 (see FIG. 2) and the control circuit 28.

An operation of the disc drive control unit 29 will now be described with reference to FIG. 3B.

The motor control circuit 29a monitors whether the MOTOR-ON signal from the control circuit 28 is at '1' or not (step 311). In other words, it monitors whether the 'drive-ON' signal is given or not. If the signal is given, then a command for rotational movement of the disc is fed to the spindle motor section 23 (step 312) and the delay circuit 29b is reset (step 313).

Thereafter, the motor control circuit 29a monitors whether MOTOR-ON signal is at '0' or not, in other words whether 'drive-OFF' signal is given or not (step 314). If the signal is given, the delay circuit 29b is set to start the timing function (step 315).

Then, the motor control circuit 29a monitors whether MOTOR-ON signal is at '1' or not (step 316) and TIME-UP signal from the delay circuit 29b is asserted or not (step 317). When TIME-UP signal from the delay circuit 19b is asserted, the motor control circuit 29a produces a command for stopping the rotation of the disc to the spindle motor section 23 (step 318).

If MOTOR-On signal is at '1' in step 316 above, the program does not proceed to step 317, but returns to step 312. Then the motor control circuit 29a repeatedly performs the control operation as stated above.

ON/OFF control operation of the spindle motor section 23 of the flexible disc drive unit 20 will now be described more detailedly with reference to FIGS. 4 and 5.

Figure 4:
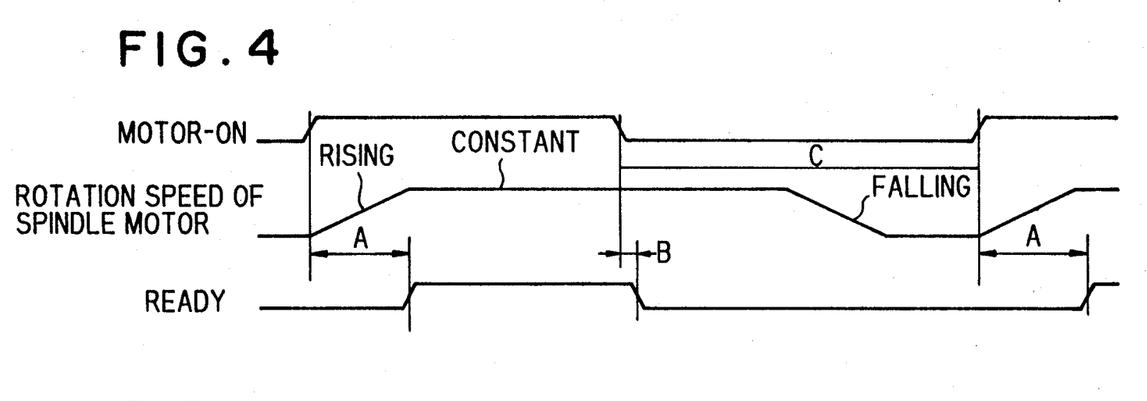
FIGS. 4 and 5 show wave forms for explaining the operation of the flexible disc drive unit.

Referring to FIG. 4, when MOTOR-ON signal is asserted or at logical '1', the spindle motor starts to rotate and the rotation speed thereof increases. After a time period indicated by A (approx. 1 sec.) has elapsed, the rotation speed becomes steady and constant and the flexible disc drive unit 20 causes READY signal to be asserted.

Thereafter, when MOTOR-ON signal is deasserted or at '0', READY signal is also deasserted after elapse of time period indicated by B (approx. 0.3 μs). Then, when a time period of approx. 2 sec. after deassertion of the MOTOR-ON signal has elapsed, the rotation speed of the spindle motor starts to decrease until the motor stops to operate.

When a time period indicated by C (2 sec. or more, for example, 4 sec. ) has elapsed and MOTOR-ON signal is again asserted, the spindle motor starts to rotate again. Then, after elapse of the time indicated by A (approx. 1 sec.) , READY signal is asserted.

Figure 5:
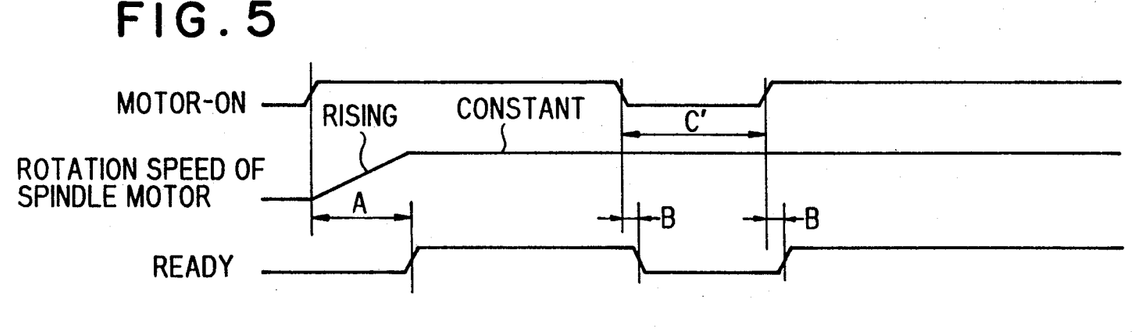

Referring to FIG. 5, when MOTOR-ON signal is asserted, the rotation speed of the spindle motor increases and after elapse of time indicated by A (approx. 1 sec.), the rotation speed becomes steady and constant and READY signal is asserted. Then, when MOTOR-ON signal is deasserted, READY signal is deasserted after elapse of the time indicated by B(approx. 0.3 μs). Thereafter, when a time period indicated by C' (less than 2 sec., for example, 0.5 sec.) has elapsed and MOTOR-ON signal is again asserted, READY signal becomes asserted after the time period indicated by B (approx. 0.3 μs). In the meanwhile, the rotation speed of the spindle motor remains constant.

The arrangement according to the present invention as stated above provides significant advantages over the configuration of the prior art.

More specifically, in the prior art, a complicated control operation must be carried out, in which, for accessing the flexible disc drive unit, the spindle motor is turned ON and a timer is started after completion of the access operation to turn OFF the spindle motor if there is no further access to the drive unit within a predetermined time interval.

In contrast, according to the present invention, such a simplified control operation will suffice that prior to the access operation, the spindle motor is turned ON and after completion of the access operation, the spindle motor is turned OFF.

Furthermore, in the prior art arrangement, when the spindle motor is turned OFF, the motor is stopped immediately. Therefore, when access to the disc drive unit is necessitated again, the system must wait for some period of time (approx. 1 sec.) until the motor gets steady rotation.

In accordance with the present invention, however, if the next access operation is to be carried out within a predetermined time interval (for example, 5 sec.), such a time which is required to get the steady rotation is not needed any more. This will improve the performance of the system.

Although one preferred embodiment of the present invention has been described above, another configuration of the system may also be provided according to the present invention as will be described below.

Figure 6:
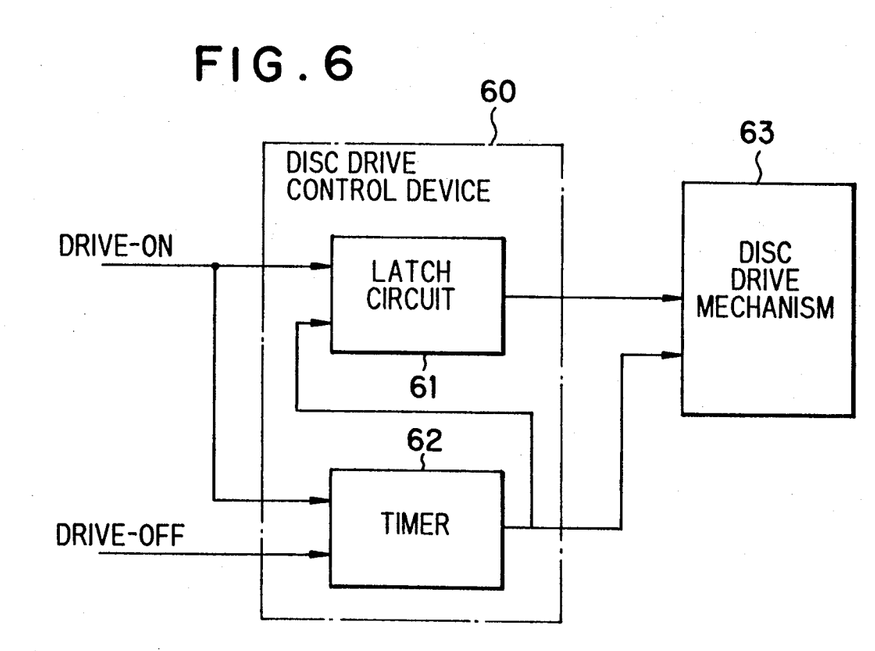
FIG. 6 is a block diagram illustrating a configuration of a disc drive unit according to another embodiment of the present invention.

Referring now to FIG. 6, a disc drive unit according to another embodiment of the present invention comprises a disc drive control section 60 and a disc drive mechanism 63.

More specifically, the disc drive control section 60 comprises a latch circuit 61 for latching 'drive-ON' signal and feeding a command for disc rotation to the disc drive mechanism 63, and a timer 62 which is activated in response to receipt of 'drive-OFF' signal for feeding a command to stop the disc rotation to the disc drive mechanism 63 after a predetermined period of time.

The timer 62 has a function to reset the latch circuit 61 as well as a function to instruct the stoppage of the rotation to the disc drive mechanism 63. The timer 62 is reset in response to 'drive-ON' signal.

Thus, the latch circuit 61 is operated in response to 'drive-ON' signal for feeding the command for disc rotation to the disc drive mechanism 63. Whereas, the timer 62 is operated in response to 'drive-OFF' signal for feeding the command for stopping the disc rotation to the disc drive mechanism 63, provided that there is no 'drive-ON' signal received within a predetermined period of time.

According to the embodiment disclosed herein, the control of disc rotation is effected as follows:

1) When the latch circuit 61 receives 'drive-ON' signal, it feeds the command for disc rotation to the disc drive mechanism 63.

2) When the time 62 receives 'drive-OFF' signal, it starts its timing function. If there is no 'drive-ON' signal received within the predetermined time interval, the timer 62 produces the command for stopping the disc rotation to the disc drive mechanism 63.

3) If in step 2) above 'drive-ON' signal is received within the predetermined time interval, the conditions as defined in step 2) above are not fulfilled, so that the command for stopping the disc rotation is not produced, restoring the step 1) above. On the other hand, if in step 2) above, the rotation of the disc is stopped, the system enters the standby mode with the conditions defined in step 1) above.

Thus, in accordance with the embodiment disclosed herein, unnecessary disc rotation can be avoided in a similar manner to that of the first embodiment. Further, when the access operation is repeated within a short period of time, the command for stopping the disc rotation can not be produced as stated in step 3) above. In this case, the normal rotation of the disc is maintained. Therefore, immediate access can be attained.

The disc drive unit described with reference to FIG. 6 is applicable to various information processing units such as the video data processing terminal described before.

Now, reference is made to an embodiment of the disc drive control unit according to the present invention.

The disc drive control unit may be incorporated in disc drive units such as the flexible disc drive unit as shown in FIG. 1. The disc drive control unit comprises means for delaying 'drive-OFF' signal and means for controlling the rotation of the disc in such a manner that when 'drive-ON' signal is received from any upstream units, the rotation of the disc is stopped.

Figure 7:
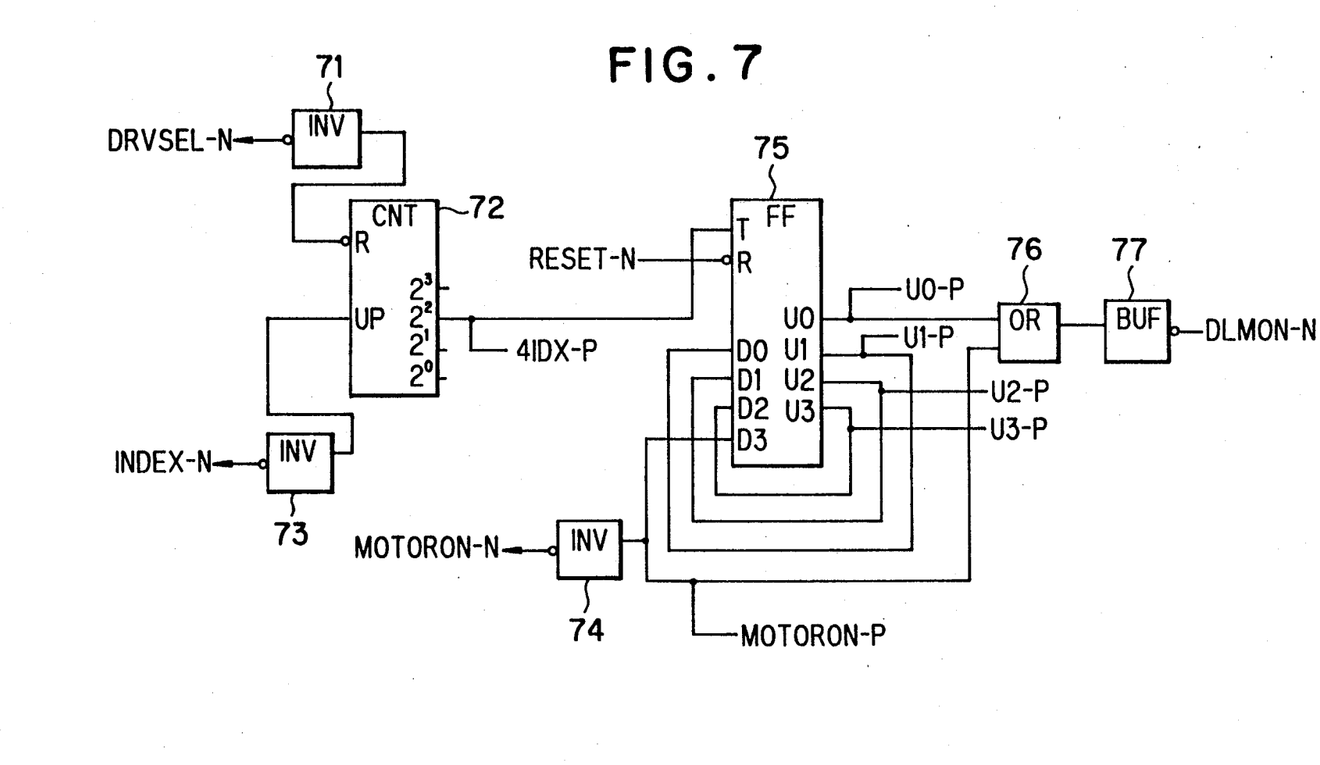
FIG. 7 is a block diagram illustrating a disc drive control device according to the present invention.

Referring to FIG. 7, the disc drive control unit comprises an inverter circuit 71 for inverting DRVSEL-N selection signal which is given when the disc drive unit having the disc drive control unit incorporated therein is selected by any upstream device, an inverter circuit 73 for inverting INDEX-N index signals which are produced every time a complete rotation of the flexible disc is effected, a counter circuit 72 which is arranged to be reset by the selection signal and to count the index signals, an inverter circuit 74 for inverting MOTOR-ON-N signal from any upstream device, and a flip-flop circuit 75 consisting of four D type flip-flop's which are triggered by pulses from the $2^2$ terminal of the counter circuit 72. These elements are arranged to form the delay means for delaying 'drive-OFF' signal.

The disc drive control device comprises, in addition to the inverter circuit 74, an OR gate circuit 75 for ORing the output of the flip-flop circuit 75 and inverted version MOTOR-ON-P of the 'Motor-ON-N' signal, and a buffer circuit 77 for temporarily storing the output of the OR gate circuit 76.

The inverter circuit 71 receives at its input DRVSEL-N selection signal of the disc drive unit from its upstream device. The selection signal is reversed in polarity through this circuit and is sent to the reset input (R) of the counter circuit 72. The index signal INDEX-N produced one per every rotation of the flexible disc is sent to the input of the inverter circuit 73. The inverted output signal of the inverter circuit 73 is connected to COUNT UP input (UP) of the counter circuit 72. Every time when four UP input signals are given, a pulse output is produced. The output signal 41DX-P on the $2^2$ terminal is sent to the trigger input (T) of the flip-flop circuit 75.

The flip-flop circuit 75 has four input terminals D0, D1, D2 and D3, and four output terminals U0, U1, U2 and U3 internally connected to the input terminals, respectively. These outputs are fedback to its inputs in such a manner that U3 output is connected to D2 input, U2 output is connected to D1 input and U1 output is connected to D0 input. Further, MOTOR-ON-P output signal of the inverter circuit 74 is coupled to D3 input of the flip-flop.

The inverter circuit 74 receives at its input MOTOR-ON-N signal from its upstream system. The output terminal U0 of the flip-flop circuit 75 is connected to one input of OR gate circuit 76. The OR gate circuit 76 has another input connected to the inverter circuit 74 at its output. The OR gate circuit 76 has an output connected to the buffer circuit 77. An output signal DLMON-N from the buffer circuit 77 is fed to the rotation start/stop input of the spindle motor section. Elements constituting each circuit are shown below by way of example. The inverter circuits 71 and 73 are formed by SN 7414 TTL integrated circuits; the counter circuit 27 is formed by SN 74193; the flip-flop circuit 75 is formed by SN 74175; and the OR gate circuit 76 is formed by SN 7432.

Operation of the embodiment will be described below with reference to FIGS. 8 and 9.

Figure 8:
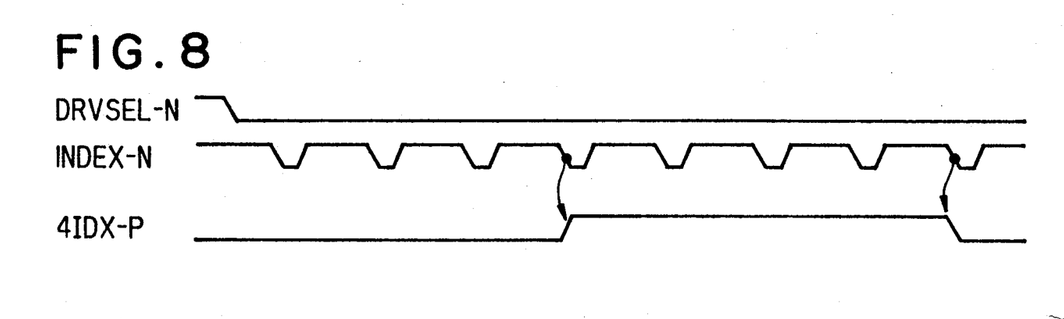
FIGS. 8 and 9 show wave forms for explaining the operation of the embodiment shown in FIG. 7.

As shown in FIG. 8, when the DRVSEL-N selection signal is at a low level, the reset input of the counter circuit 72 becomes high. Then, when INDEX-N index signal is produced as a low level pulses after each rotation of the flexible disc, the signal 41DX-P on the $2^2$ output terminal of the counter circuit 72 alternates between high and low levels for each of four index pulses.

Figure 9:
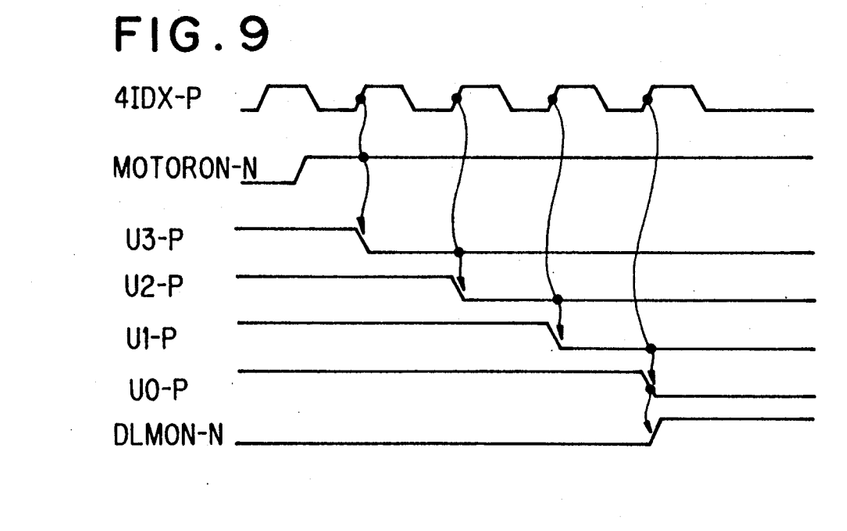

Then, when MOTOR-ON-N signal is made high, which serves as 'drive-OFF' signal, to stop the rotation of the motor by the upstream unit, while 41DX-P signal being produced as pulses shown in FIG. 9, the output signal U3 of the flip-flop circuit 75 becomes low at a rising edge of next 41DX-P pulse; the output signal U2-P becomes low at a rising edge of the next succeeding 41DX-P pulse; the output signal U1-P becomes low at a rising edge of the next next further succeeding 41DX-P pulse; and the output signal U0-P becomes low at a rising edge of the next further succeeding 41DX-P pulse. Both u)-P and MOTOR-ON-P signals become low. Thee signals are fed to the OR gate circuit 76 which produces a low level output.

The output from the OR gate circuit is supplied to the buffer circuit 77. As a result of this, DLMON-N output signal from the buffer 77 becomes high with a delay equal to time interval for four 41DX-P pulses after the MOTOR-ON-N signal has become high. That is, 'drive-OFF' signal from the upstream device is outputted with the delay.

The delay time is calculated as follows:

Assuming that the period of the INDEX-N index signal is 167 ms and 41DX-P pulses are counted four times, the delay time is:

$$167(ms) \times 4(times) \times 4(times) \approx 2.6 \text{ sec.}$$

Further assuming that 41DX-P pulses are counted five times, the delay time is:

$$167(ms) \times 4(times) \times 5(times) \approx 3.3 \text{ sec.}$$

The optimum delay time can be selected depending upon the relationship to the upstream device.

In operation described above, when there is an access request occurred after 'drive-OFF' or MOTOR-ON-P signal has become high and before DLMON-N output signal has been produced, and when 'drive-ON' or MOTOR-ON-N signal becomes low, this signal is inverted in polarity through the inverter circuit 74 (FIG. 7) and MOTOR-ON-P signal becomes high, which is then sent to the OR gate circuit 76. As a result, the output of the OR gate circuit 76 becomes high irrespective of the level of its other input so that the buffer circuit 77 produces inverted output DLMON-N at a low level.

Similarly, in case where 'drive-ON' signal is sent from the upstream unit with the disc stopped, the OR gate circuit 76 becomes free-pass condition for the signal without any delay so that the signal is directly passed through as 'drive-ON' signal.

The disc drive control device according to the embodiment disclosed herein, incorporated into the disc drive unit, is applicable to various data processing systems.

The disc drive unit and the disc drive control device disclosed herein can be used not only to the flexible disc drive system, but also to a hard disc drive system. In addition to the information processing devices, the disc drive unit can also be sued to other electronic equipments, such as measuring devices, control devices, communication devices or the like which include magnetic discs such as flexible discs, etc. as storage medium for storing data, programs and so on. As a further embodiment, it is possible that DRIVE SELECT signal is substituted for MOTOR-ON signal to attain the same effect as that described above.

Alternatively, ON/OFF control of the signals may be achieved by means of hardware circuit rather than program control as stated above. For example, a special key for ON/OFF function of the disc drive mechanism may be mounted on the key board and a signal entered through this key may be used to signal the disc drive control device.

It is apparent from the foregoing that according to the present invention, a new and improved disc drive unit is provided in which stoppage of the disc rotation is controlled so that the frequency of occurrences of waiting state upon access to the disc is reduced and degrading of the system throughput is minimized. This is capable of preventing wear of the disc and capable of executing the control function without significant burden on the program.

Although the invention has been described with reference to preferred embodiments, numerous modifications and variations of the present invention are possible in the light of the above teachings. It is therefore to be understood that within the scope of the appended claims, the invention may be practiced otherwise than as specifically described herein.

What is claimed is:

1. A method of controlling rotational movement of a disc by means of a disc drive mechanism, which comprises the steps of:
   sending a command for disc rotation to the disc drive mechanism in response to a 'drive-ON' signal received;
   starting a timing operation in response to a 'drive-OFF' signal received; and
   sending a command for stoppage of disc rotation to the disc drive mechanism if there is no further 'drive-ON' signal received within a predetermined time interval of the timing operation.

2. A method of controlling rotational movement of a disc according to claim 1, in which said 'drive-ON' signal and said 'drive-OFF' signal are provided in the form of different states of one signal.

3. A method of controlling rotational movement of a disc according to claim 2, in which said different states of one signal are high and low levels of the signal.

4. Apparatus comprising means for controlling rotational movement of a disc driven by a disc drive mechanism including means for supplying the disc drive mechanism with a command for disc rotation in response to a 'drive-ON' signal supplied thereto, and means for sending the disc drive mechanism a command for stoppage of disc rotation after elapse of a predetermined time interval if no 'drive-ON' signal is received within the predetermined time interval after a 'drive-OFF' signal has been received.

5. Apparatus according to claim 4, further comprising timing means for setting the predetermined time interval.

6. Apparatus according to claim 4, further comprising a disc drive mechanism for providing rotational movement to a disc.

7. Apparatus according to claim 6, further comprising a processor for information processing coupled to the disc drive mechanism and the controlling means, the disc drive mechanism being a flexible disc drive unit.

8. Apparatus according to claim 6, further comprising a memory medium.

9. Apparatus comprising means for controlling rotational movement of a disc driven by a disc drive mechanism including means for maintaining disc rotation by the disc drive mechanism until a predetermined time interval has elapsed after receipt of a 'drive-OFF' signal, and means for starting disc rotation by the disc drive mechanism irrespective of presence or absence of the 'drive-OFF' signal whenever a 'drive-ON' signal is received.

10. Apparatus according to claim 7, further comprising a disc drive mechanism for providing rotational movement to a disc.

11. Apparatus according to claim 10, further comprising processor for information processing coupled to the disc drive mechanism and the controlling means, the disc drive mechanism being a flexible disc drive unit.

12. Apparatus according to claim 10, further comprising a memory medium.

13. Apparatus comprising means for controlling rotational movement of a disc driven by a disc drive mechanism including delay means for outputting a 'drive-OFF' signal after a delay of a predetermined time interval from receipt of a signal indicating stopping rotation of the disc, and disc drive mechanism control means for starting rotation of the disc in response to a 'drive-ON' signal supplied thereto and for stopping rotation of the disc in response to the 'drive-OFF' signal outputted from the delay means.

14. Apparatus according to claim 13, wherein the delay means includes means for resetting the delay means to prevent outputting of the 'drive-off' signal therefrom in response to issuance of a 'drive-ON' signal within the predetermined time interval.

15. Apparatus according to claim 13, further comprising a disc drive mechanism for providing rotational movement to a disc.

16. Apparatus according to claim 15, further comprising a processor for information processing coupled to the disc drive mechanism and the controlling means, the disc drive mechanism being a flexible disc drive unit.

17. Apparatus according to claim 15, further comprising a memory medium.

* * * * *

UNITED STATES PATENT AND TRADEMARK OFFICE
CERTIFICATE OF CORRECTION

PATENT NO. : 5,070,417
DATED : December 3, 1991
INVENTOR(S) : A. Kawashita

It is certified that error appears in the above-identified patent and that said Letters Patent is hereby corrected as shown below:

Column 12, line 37 (claim 10), delete "7" and insert --9--.

Signed and Sealed this

Nineteenth Day of July, 1994

Attest:

BRUCE LEHMAN

Attesting Officer            Commissioner of Patents and Trademarks